J. Murphy,
Wringer Roller,
N° 58,874. Patented Oct. 16, 1866.

Witnesses
Timothy Canwell
Linus Heath

Inventor
John Murphy

UNITED STATES PATENT OFFICE.

JOHN MURPHY, OF NEW YORK, N. Y.

IMPROVED ROLLER FOR CLOTHES-WRINGERS.

Specification forming part of Letters Patent No. 58,874, dated October 16, 1866.

*To all whom it may concern:*

Be it known that I, JOHN MURPHY, of the city of New York, in the State of New York, have invented a certain new and useful Improvement in Elastic Rollers suitable for wringers and analogous machines; and I do hereby declare that the following is a full and exact description thereof.

The principal material in my rollers is vulcanized rubber or the compounds which are generally known by that name. A portion of the material, however, is fibrous, and the arrangement of the fibrous portion is peculiar.

I will proceed to describe what I consider the best mode of carrying out my invention, and will afterward designate the points which I believe to be new.

The accompanying drawings form a part of this specification.

Figure 1:
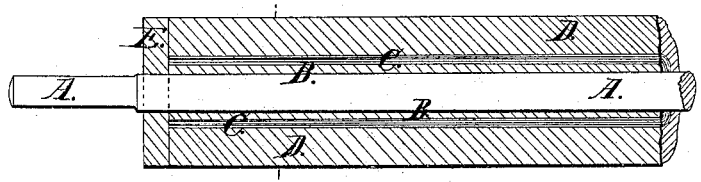
Figure 2:
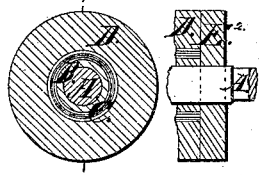
Figure 3:
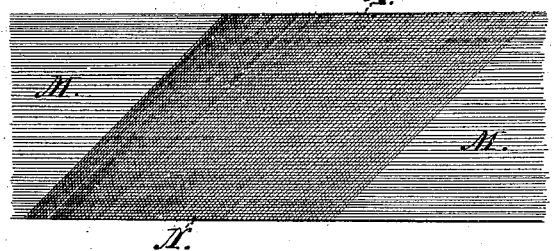
Figure 4:
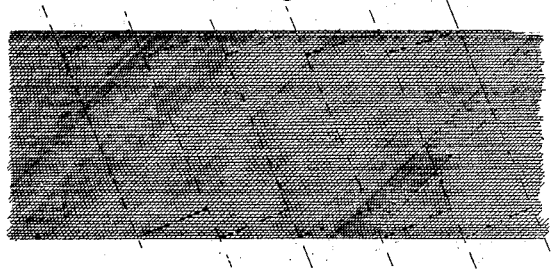
Figure 5:
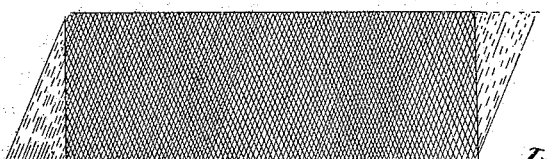

Figure 1 is a longitudinal section, and Fig. 2 is a cross-section, of the roll. Fig. 3 shows the manner of weaving the fabric employed; Fig. 4, the manner of cutting the same; Fig. 5, a piece of fabric.

Similar letters of reference indicate like parts in all the figures.

B is the inner portion of a hollow cylindrical mass which forms the roll. C is a layer or series of layers of woven fabric. D is the exterior portion of the rubber. The thickness of the rubber D is much greater than the thickness of the rubber B.

$E^1$ $E^2$ are disks of rubber applied so as to cover the end of the roll. The parts B, C, D, $E^1$, and $E^2$ are applied together in their proper positions before the rubber is vulcanized, and the whole is united so as to form a unit in the act of vulcanizing the rubber. The woven fabric C is completely inclosed within the rubber.

In preparing the fabric C it is important that it shall have more elasticity than ordinary cloth. There are several ways by which this may be effected, the essential requisite for my invention being that it shall afford a firm and very efficient support for the rubber, while it shall at the same time be more elastic and allow a greater enlargement of its diameter than would be practicable with cloth woven in the ordinary manner.

I can employ cotton, linen, woolen, or any ordinary material for the fabric C; but, in order to give it the proper elasticity, I prefer to weave and cut it in the manner represented in Figs. 3, 4, and 5.

I arrange the loom in a manner well known to weavers, so that the filling is not extended at right angles to the warp, but makes an angle of about forty-five degrees therewith.

The position of the yarns is very clearly shown in Fig. 3, where M indicates the direction of the warp, and N the direction of the filling-yarns.

The fabric having been woven in this manner, I cut it across obliquely at an angle of sixty-seven and one-half degrees with the warp, and thus obtain pieces, which being properly trimmed and wound around the inner layer, B, the rubber is in a condition to yield a very large amount of elasticity.

Fig. 5 shows the material of the fabric C in a condition ready to be rolled up in the roll.

In order to apply the gum and the fabric together, I roll up the inner material, B, on a suitable mandrel by winding around a thin sheet of raw rubber in the usual manner. I then apply the edge of the fabric, (see Fig. 5,) and wind the fabric around as many times as is required to give the requisite strength. I then commence again with a thin sheet of raw rubber, and wind it around on the outside of the fabric C until a sufficient quantity is accumulated; then cement or otherwise secure the edge. I then produce disks of raw rubber by any convenient means, as by cutting from a thick sheet or by cutting off lengths of the roll previously formed of raw rubber, and having applied these disks, as indicated by $E^1$ and $E^2$, I place the whole in a suitable mold, and place it in the vulcanizing-oven.

My rolls differ from the ordinary rolls made of vulcanized rubber alone in the fact that the fabric C receives the whole of the distending strain when the roll is forced on the shaft. It is common to force into the interior of a rubber roll a shaft considerably larger than the hole. Thus, for example, a rubber roll having the hole one-half inch in diameter is made to receive a shaft having a diameter of three-fourths or seven-eighths of an inch. This stretches and strains the whole mass of the rubber.

In the use of my roll a similar difference must be allowed. A difference of diameter of one-sixteenth or one-eighth of an inch is sufficient. Taking a roll having an internal diameter of five-eighths and forcing it into a shaft having a diameter of three-fourths of an inch, the interior rubber, B, is violently compressed, and the fabric C is greatly strained and yields sensibly, but not to the same extent as would the rubber if the fabric C were not present. The contact between the rubber on the interior of the roll and the exterior of the shaft A is tighter and more firm than any ordinary rolls, while the mass D of the rubber is not distended or distorted to any serious extent.

My invention allows a more firm union of the shaft with the roll, while the roll is more elastic and more durable than usual.

Having now fully described my invention, what I claim as new, and desire to secure by Letters Patent, is as follows:

The fabric C, mounted within the mass of gum, so as to form a compound elastic roll, substantially of the character and for the purpose herein set forth.

JOHN MURPHY.

Witnesses:
J. PIERSON HEARTT,
TIMOTHY CROMWELL.